(12) United States Patent
Eno et al.

(45) Date of Patent:

(10) Patent No.: US 10,210,751 B1
(45) Date of Patent: Feb. 19, 2019

(54) IDENTIFICATION OF TRAFFIC CONTROL MECHANISMS USING MACHINE LEARNING

(71) Applicant: VERIZON PATENT AND LICENSING INC., Basking Ridge, NJ (US)

(72) Inventors: Joshua D. Eno, Denver, CO (US); Tristan Storz, Lakewood, CO (US); John P. O'Dwyer, Denver, CO (US); Lindy Williams, Broomfield, CO (US); Zeehasham Rasheed, Herndon, VA (US); Kevin Brackney, Westminster, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/669,429

(22) Filed: Aug. 4, 2017

(51) Int. Cl.
| | |
|---|---|
| *G08G 1/01* | (2006.01) |
| *G06N 99/00* | (2010.01) |
| *G01C 21/34* | (2006.01) |
| *G01C 21/36* | (2006.01) |
| *G08G 1/0968* | (2006.01) |
| *G08G 1/052* | (2006.01) |
| *G08G 1/056* | (2006.01) |
| *G06N 7/00* | (2006.01) |

(52) U.S. Cl.
CPC ....... *G08G 1/0125* (2013.01); *G01C 21/3446* (2013.01); *G01C 21/3492* (2013.01); *G01C 21/3629* (2013.01); *G06N 7/005* (2013.01); *G06N 99/005* (2013.01); *G08G 1/0145* (2013.01); *G08G 1/052* (2013.01); *G08G 1/056* (2013.01); *G08G 1/096827* (2013.01); *G08G 1/096872* (2013.01); *G08G 1/096888* (2013.01); *G01C 21/3461* (2013.01)

(58) Field of Classification Search
USPC ......................................................... 701/119
See application file for complete search history.

(56) References Cited

U.S. PATENT DOCUMENTS

| | | | | | |
|---|---|---|---|---|---|
| 5,402,117 | A | * | 3/1995 | Zijderhand | ...... G08G 1/096827 340/905 |
| 5,986,575 | A | * | 11/1999 | Jones | ...................... G08G 1/087 340/906 |
| 7,512,487 | B1 | * | 3/2009 | Golding | ............. G01C 21/3484 701/424 |
| 7,680,749 | B1 | * | 3/2010 | Golding | ............. G01C 21/3484 706/14 |

(Continued)

*Primary Examiner* — Tyler D Paige

(57) ABSTRACT

A device can receive a data model that has been trained on base map data and summary statistics data associated with a first geographic region. The device can obtain additional base map data associated with a second geographic region and additional summary statistics data for a set of junctions within the second geographic region. The device can determine traffic control mechanisms associated with the set of junctions by providing the additional base map data and the additional summary statistics data as input for the data model. The device can generate, using output of the data model, a base map that includes information indicating whether the set of junctions include traffic control mechanisms. The device can, after generating the base map, perform one or more actions associated with improving vehicle navigation or traffic management.

20 Claims, 7 Drawing Sheets

(56) References Cited

U.S. PATENT DOCUMENTS

| | | | |
|---|---|---|---|
| 8,996,234 B1* | 3/2015 | Tamari | G07C 5/0808 |
| | | | 701/123 |
| 9,251,703 B1* | 2/2016 | Mbekeani | G08G 1/091 |
| 9,672,734 B1* | 6/2017 | Ratnasingam | G08G 1/0112 |
| 9,805,595 B1* | 10/2017 | Liebinger Portela | |
| | | | G08G 1/0145 |
| 2007/0229309 A1* | 10/2007 | Tomita | G01C 21/3691 |
| | | | 340/992 |
| 2009/0192688 A1* | 7/2009 | Padmanabhan | G08G 1/0104 |
| | | | 701/70 |
| 2010/0076621 A1* | 3/2010 | Kubotani | G08G 1/166 |
| | | | 701/1 |
| 2010/0100268 A1* | 4/2010 | Zhang | B60W 30/09 |
| | | | 701/25 |
| 2010/0299021 A1* | 11/2010 | Jalili | G07C 5/085 |
| | | | 701/33.4 |
| 2012/0029800 A1* | 2/2012 | Kluge | G01C 21/32 |
| | | | 701/117 |
| 2016/0282132 A1* | 9/2016 | Bostick | G01C 21/3415 |
| 2017/0138747 A1* | 5/2017 | Brito | G01C 21/3617 |
| 2017/0309172 A1* | 10/2017 | Linder | G08G 1/0133 |

* cited by examiner

IDENTIFICATION OF TRAFFIC CONTROL MECHANISMS USING MACHINE LEARNING

BACKGROUND

A navigation system can utilize geographic map data to identify a path for a user. For example, a navigation system can receive arrival coordinates and destination coordinates, and can use pathing algorithms and geographic map data (e.g., road-side speed limits, a number of lanes associated with particular roads, etc.) to identify a path for a user.

DETAILED DESCRIPTION OF PREFERRED EMBODIMENTS

Figure 1A:
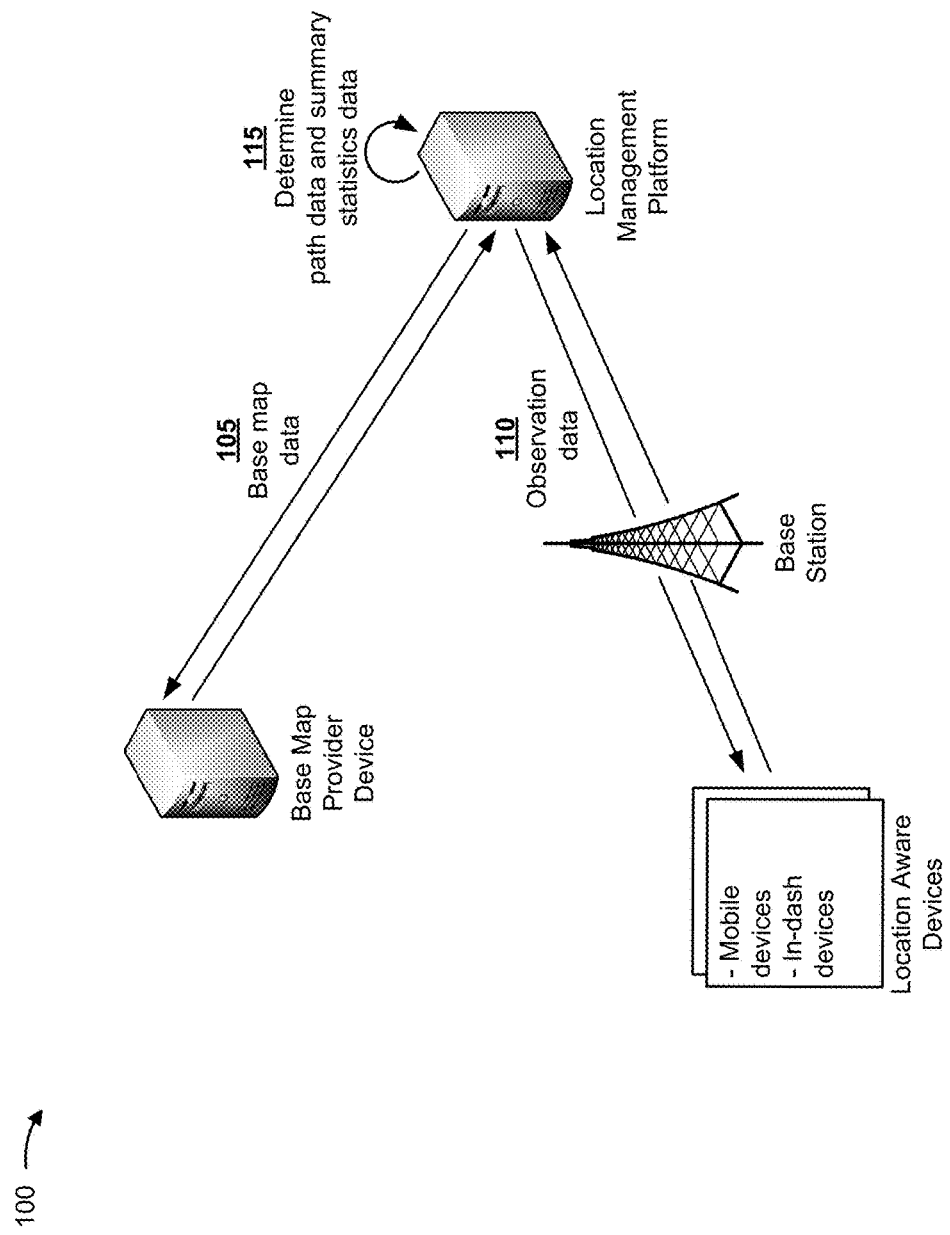
FIGS. 1A-1D are diagrams of an overview of an example implementation described herein.

The following detailed description of example implementations refers to the accompanying drawings. The same reference numbers in different drawings can identify the same or similar elements.

Geographic map data (referred to hereafter as base map data) can be used to make vehicle navigation decisions and/or traffic management decisions. For example, a user device can provide a request for a set of navigational directions that includes an arrival location and a destination location. In this case, the device can use the base map data and one or more path-finding algorithms to identify a path for a user. However, limited information included in the base map data can lead to execution of inefficient or unsafe path-finding algorithms. For example, base map data that does not identify traffic control mechanisms (e.g., traffic lights, stop signs, etc.), or that sporadically identifies traffic control mechanisms, can cause path-finding algorithms to output inefficient or unsafe paths. Additionally, base map data without properly identified traffic control mechanisms can lead to unclear voice messages for users that receive navigational directions, incorrect estimated time of arrival (ETA) predictions, and/or the like.

Some implementations described herein provide a location management platform to use machine learning to generate a base map that identifies traffic control mechanisms at a set of junctions located within a geographic region, where the base map can then be utilized to perform vehicle navigation decisions and/or traffic management decisions. For example, the location management platform can obtain base map data and observation data, and can analyze the observation data to determine path data and summary statistics data. In this case, the location management platform can use the base map data, the path data, and the summary statistics data to train a data model.

Additionally, the location management platform can use the data model to identify traffic control mechanisms at a set of junctions (e.g., intersections) located within a geographic region. For example, the location management platform can provide additional base map data, additional path data, and additional summary statistics data as input for the data model, which can cause the data model to output, for each junction of the set of junctions, a classification identifying a traffic control mechanism (or lack thereof) used for a particular direction of each junction. Furthermore, the location management platform can use the output of the data model to generate a base map that identifies the traffic control mechanisms, and can use the base map to perform actions associated with improving vehicle navigation and/or traffic management.

For example, the location management platform can use a base map to identify a best-fit path for a user, provide clearer voice messages associated with navigational directions, provide more accurate destination arrival time predictions, generate recommendations to install, remove, or make a modification to a traffic control mechanism at a particular junction, and/or the like. In this way, the location management platform conserves processing resources and/or network resources relative to devices that are unable to utilize a base map that identifies traffic control mechanisms.

FIGS. 1A-1D are diagrams of an overview of an example implementation 100 described herein. As shown in FIG. 1A, and by reference number 105, a location management platform can obtain, from a base map provider device, base map data for a first geographic region (e.g., a city). For example, the location management platform can obtain base map data that is open-source, base map data that is commercially available, and/or the like. The base map data can include a set of values indicating attributes of a road map, such as geographic coordinates of junctions, geographic coordinates of areas between the junctions, functional road classes, speed limits, a number of lanes associated with a road, and/or the like.

As shown by reference number 110, the location management platform can obtain, from a set of location aware devices, observation data for a set of vehicles within the first geographic region. A location aware device can be a mobile device (e.g., a mobile phone, a tablet, a hand-held navigation device, etc.), an in-dash device located within a vehicle, and/or the like. The observation data can include a set of values used to identify a location of a vehicle at a particular time period, such as a geographic location of the vehicle, a time stamp, a vehicle identifier, a vehicle speed, and/or the like.

As shown by reference number 115, the location management platform can determine path data and summary statistics data. For example, the location management platform can determine path data by analyzing the observation data throughout an interval. The path data can identify a path that a vehicle travels, and can be determined by creating logical connections between sets of geographic coordinates included in the observation data. In some cases, the location aware devices might not report vehicle speed and/or vehicle direction. In this case, the location management platform can determine vehicle speed and/or vehicle direction using the geographic coordinates and time stamps included in the observation data.

Additionally, the location management platform can determine summary statistics data. For example, the location management platform can determine summary statistics data for a set of junctions by analyzing the path data. Summary statistics data can include one or more values associated with vehicle speed and/or vehicle direction, such as an average vehicle stop time at a junction, an average vehicle speed at one or more geographic coordinates associated with a junction, a maximum vehicle speed at a junction, a minimum vehicle speed at junction, a total number of vehicles traveling through the junction in a particular direction (e.g., to identify a number of vehicles turning left, turning right, traveling straight, etc.), and/or the like.

In this way, the location management platform can determine path data and summary statistics data that can be further processed to train a data model.

Figure 1B:
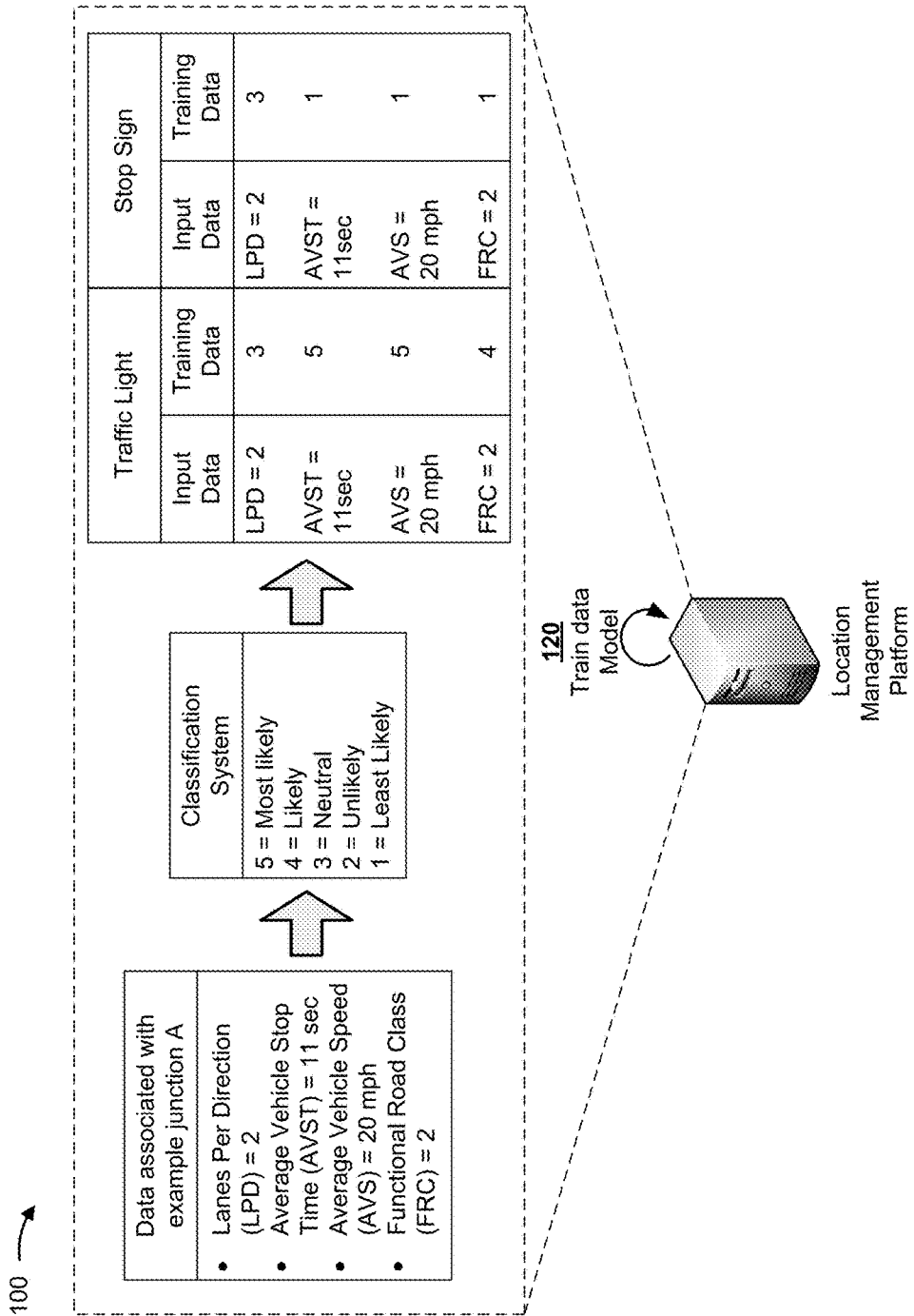

As shown in FIG. 1B, and by reference number 120, the location management platform can train a data model. For example, the location management platform can train a data model using machine learning. In this case, the location management platform can train the data model by associating the base map data, the path data, and the summary statistics data with one or more training values. The one or more training values can indicate a likelihood of a traffic control mechanism being located at a junction. In this case, the associations between the training values and the base map data, the path data, and the summary can be processed for each junction within the first geographic region, causing the data model to output a classification identifying a traffic control mechanism (or lack thereof) for each directional pairing (e.g., north-south, east-west) associated with each junction within the first geographic region.

Shown as an example, the location management platform can associate one or more training values with path data and summary statistics data of junction A. For example, the location management platform can employ a classification system where a 5 indicates a highest likelihood of a junction including a particular traffic control mechanism, and a 1 indicates a lowest likelihood of a junction including a particular traffic control mechanism. In this case, the one or more training values can indicate a likelihood of a traffic light being located at junction A, and a likelihood of a stop sign being located at junction A.

In this example, to determine whether a traffic light is located at junction A, the location management platform can associate the number of lanes per direction (e.g., two) with a training value of 3, associate the average vehicle stop time of 11 seconds with a training value of 5, associate the average vehicle speed of 20 miles per hour with a training value of 5, and associate the functional road class of 2 with a training value of 4. To illustrate the logic used in configuring training values, an average vehicle stop time of 11 seconds can be a strong indicator of junction A having a traffic light (e.g., because the average vehicle stop time would be much lower if junction A had a stop sign, a yield sign, no traffic control mechanism, etc.). As such, the value can be associated with a training value of 5.

Additionally, to determine whether a stop sign is located at junction A, the location management platform can associate the two lanes per direction with a training value of 3, associate the average vehicle stop time of 11 seconds with a training value of 1, associate the average vehicle speed of 20 miles per hour with a training value of 1, and associate the functional road class of 2 with a training value of 1. To illustrate the logic used in configuring training values, an average vehicle stop time of 11 seconds can be a weak indicator of junction A having a stop sign (e.g., because the average vehicle stop time would be much lower if junction A had a stop sign). As such, the value can be associated with a training value of 1.

In this way, the location management platform can train a data model that can be used in determining whether a junction includes a particular traffic control mechanism.

Figure 1C:
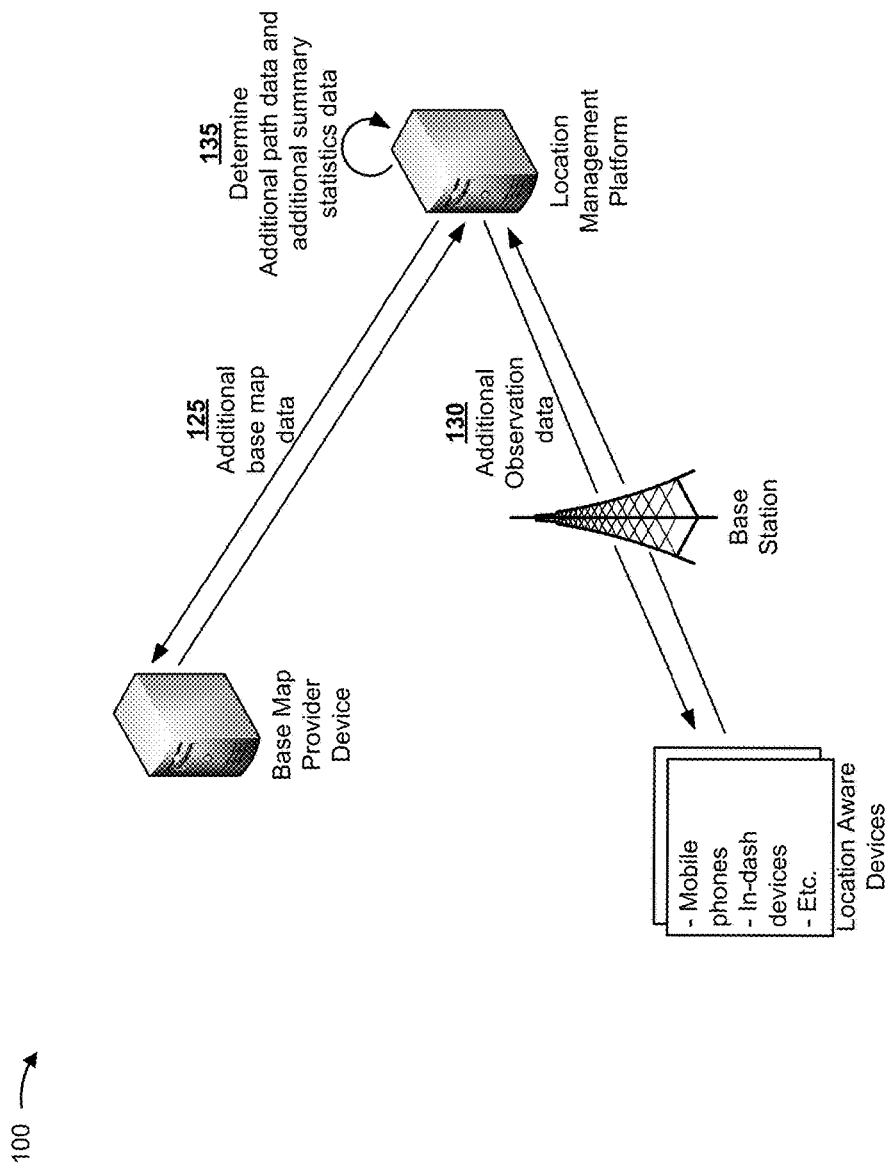

As shown in FIG. 1C, and by reference number 125, the location management platform can obtain, from the base map provider device, additional base map data for a second geographic region (e.g., an entire state, an entire country, a different city, etc.). For example, the location management platform can obtain additional base map data so that the data model can be used to identify traffic control mechanisms within the second geographic region.

As shown by reference number 130, the location management platform can obtain, from the location aware devices, additional observation data for a set of vehicles traveling within the second geographic region. As shown by reference number 135, the location management platform can determine additional path data and additional summary statistics data in the same manner described above.

In this way, the location management platform can use the data model to process the additional base map data, the additional path data, and the additional summary statistics data to identify traffic control mechanisms at a set of junctions included in the second geographic region.

Figure 1D:
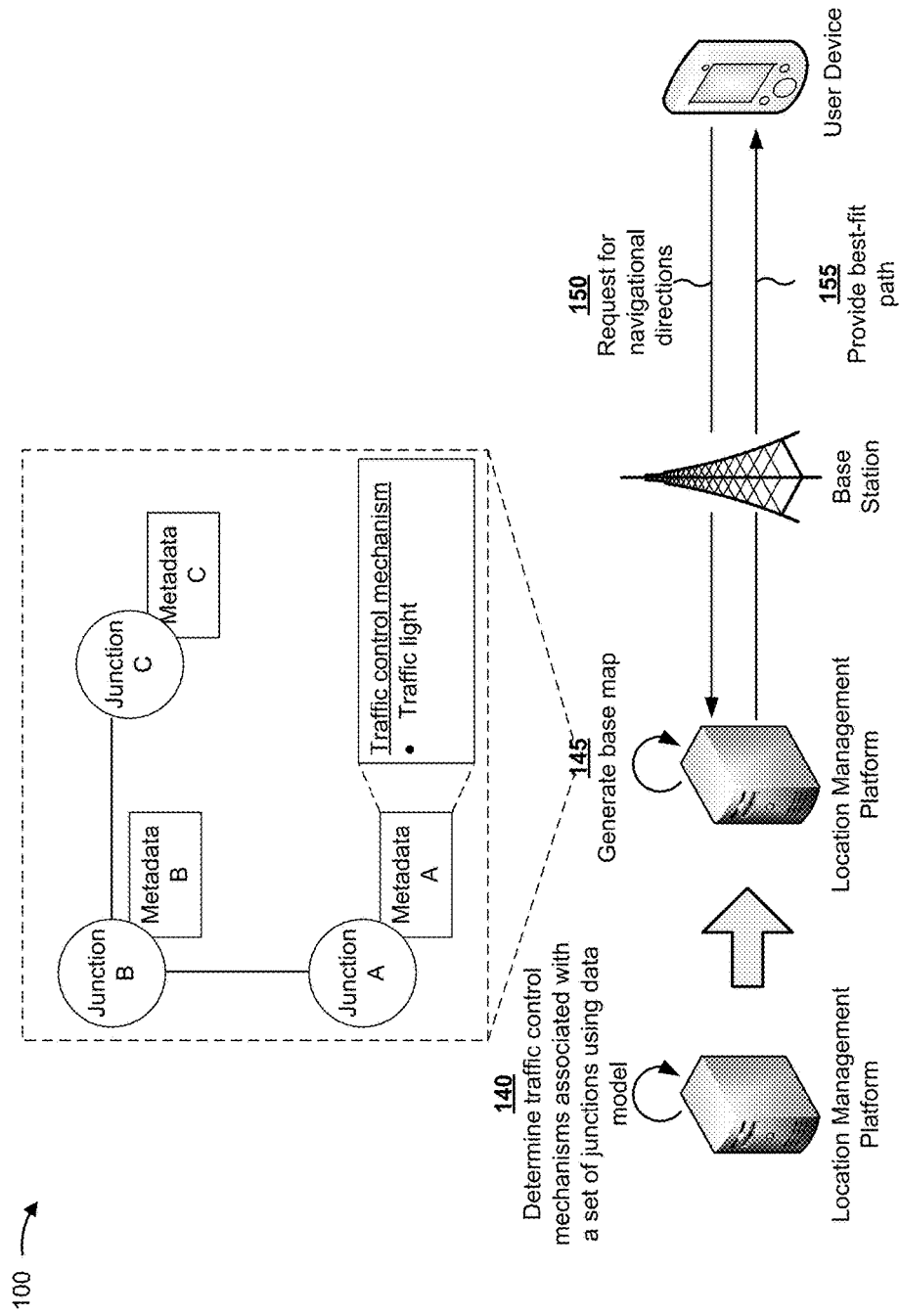

As shown in FIG. 1D, and by reference number 140, the location management platform can determine traffic control mechanisms associated with a set of junctions using the data model. For example, the location management platform can provide the additional base map data, the additional path data, and the additional summary statistics data as input for the data model, which can cause the data model to output, for each junction of the set of junctions, a classification identifying a traffic control mechanism (or lack thereof) used for a particular direction of a junction.

As shown by reference number 145, the location management platform can generate a base map. For example, the location management platform can generate a base map that identifies one or more traffic control mechanisms at junctions using the output of the data model. In this case, information identifying traffic control mechanisms at junctions can be stored as metadata. Shown as an example, the base map can be a graph data structure that includes nodes and edges, where the nodes are junctions and the edges are geographic areas between the junctions. In this case, the information identifying traffic control mechanisms can be stored as node metadata.

As shown by reference number 150, the location management platform can receive, from a user device, a request for a set of navigational directions. For example, the location management platform can receive a request for a set of navigational directions that includes information indicating an arrival location and information indicating a destination location.

As shown by reference number 155, the location management platform can provide, to the user device, a set of navigational directions associated with a best-fit path. For example, the location management platform can use the base map and one or more path-finding algorithms to identify a best-fit path (e.g., a fastest path, a safest path, a most fuel-efficient path, etc.). In this case, the base map can enable the one or more path-finding algorithms to identify a best-fit path due to the base map including information identifying traffic control mechanisms. Furthermore, the location management platform can provide the set of navigational directions associated with the best-fit path to the user device.

In this way, the location management platform is able to use the information identifying the traffic control mechanisms to identify a best-fit path for a user. By identifying the best-fit path for the user, the location management platform conserves processing resources relative to devices that identify an inefficient path and might need to recalculate a path mid-route, conserves natural resources (e.g., conservation of fuel), improves driver safety, and/or the like.

As indicated above, FIGS. 1A-1D are provided merely as an example. Other examples are possible and can differ from what was described with regard to FIGS. 1A-1D. For example, in other implementations, the location management platform can use the base map to provide clearer voice messages when providing navigational directions, more accurate destination arrival time predictions, traffic infrastructure modifications (e.g., by recommending to build a new traffic control mechanism, by recommending to modify or by modifying a traffic light signal timer, etc.), and/or the like.

Figure 2:
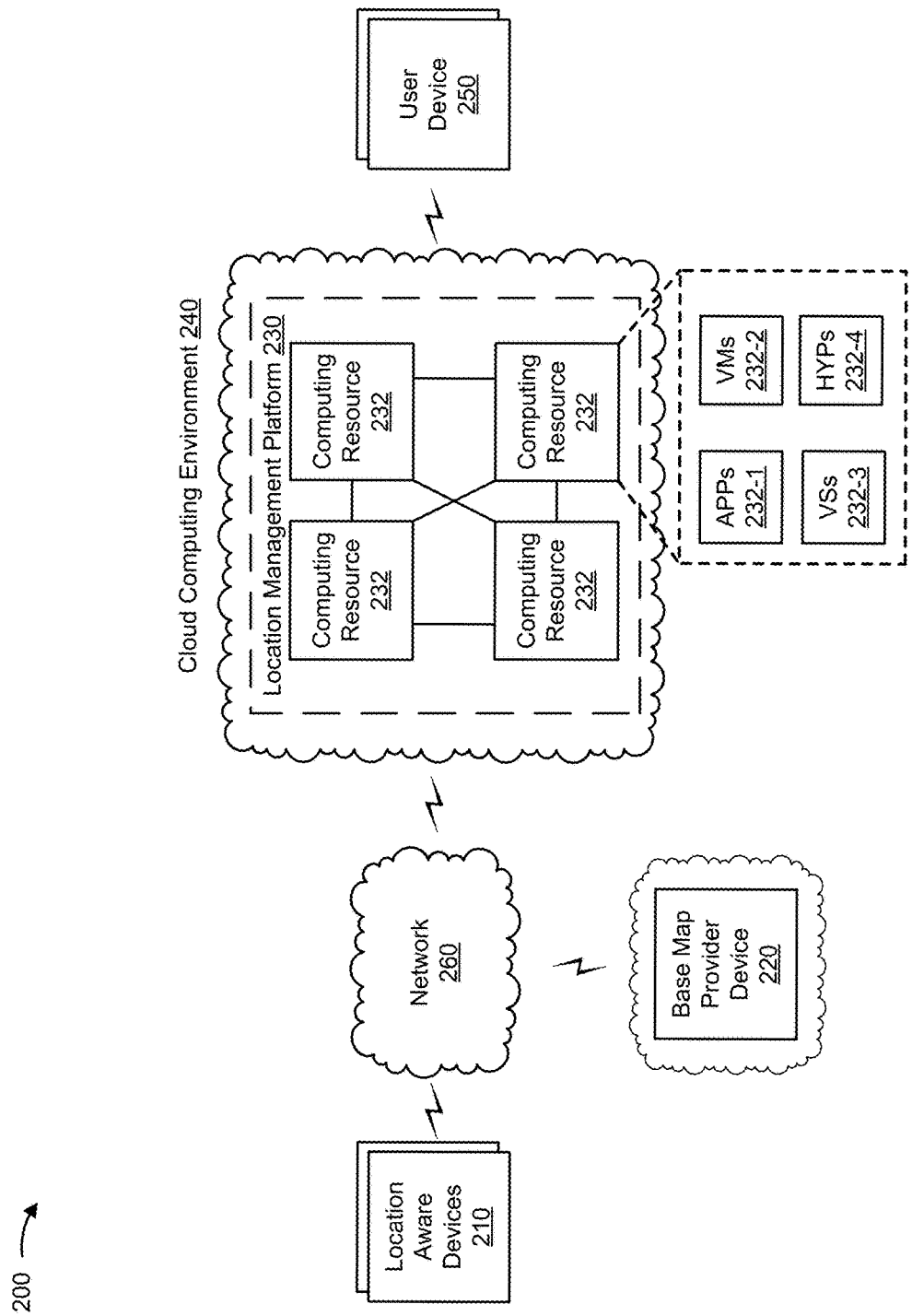
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include location aware devices 210, base map provider device 220, location management platform 230 hosted within cloud computing environment 240, user device 250, and/or network 260. Devices of environment 200 can interconnect via wired connections, wireless connections, or a combination of wired and wireless connections.

Location aware devices 210 include one or more devices capable of obtaining, monitoring, storing, and/or providing observation data. For example, location aware devices 210 can include a sensor (e.g., a vehicle sensor, a sensor located at the intersection, etc.), a camera (e.g., a traffic camera, a vehicle camera, etc.), a device associated with a vehicle, such as a smart phone, a speed detecting device, a global positioning system (GPS) receiver device, and/or any other device capable of obtaining, monitoring, storing, and/or providing observation data.

Base map provider device 220 includes one or more devices capable of receiving, storing, processing, and/or providing base map data. For example, base map provider device 220 can include a server or a group of servers. In some implementations, base map provider device 220 can receive a request, from location management platform 230, for base map data, which can cause base map provider device 220 to provide the base map data to location management platform 230. In some implementations, base map provider device 220 can be configured to automatically provide base map data to location management platform 230.

Location management platform 230 includes one or more devices capable of receiving, storing, processing, and/or providing data associated with a set of junctions. For example, location management platform 230 can include a computing device, such as a server device (e.g., a host server, a web server, an application server, etc.), a data center device, or a similar device. In some implementations, location management platform 230 can obtain base map data and/or additional base map data from base map provider device 220. In some implementations, location management platform 230 can obtain observation data and/or additional observation data from location aware devices 210. In some implementations, location management platform 230 can provide a set of navigational directions associated with a best-fit path to user device 250.

In some implementations, as shown, location management platform 230 can be hosted in cloud computing environment 240. Notably, while implementations described herein describe location management platform 230 as being hosted in cloud computing environment 240, in some implementations, location management platform 230 might not be cloud-based (i.e., can be implemented outside of a cloud computing environment) or can be partially cloud-based.

Cloud computing environment 240 includes an environment that hosts location management platform 230. Cloud computing environment 240 can provide computation, software, data access, storage, and/or other services that do not require end-user knowledge of a physical location and configuration of system(s) and/or device(s) that host location management platform 230. As shown, cloud computing environment 240 can include a group of computing resources 232 (referred to collectively as "computing resources 232" and individually as "computing resource 232").

Computing resource 232 includes one or more personal computers, workstation computers, server devices, or another type of computation and/or communication device. In some implementations, computing resource 232 can host location management platform 230. The cloud resources can include compute instances executing in computing resource 232, storage devices provided in computing resource 232, data transfer devices provided by computing resource 232, etc. In some implementations, computing resource 232 can communicate with other computing resources 232 via wired connections, wireless connections, or a combination of wired and wireless connections.

As further shown in FIG. 2, computing resource 232 includes a group of cloud resources, such as one or more applications ("APPs") 232-1, one or more virtual machines ("VMs") 232-2, virtualized storage ("VSs") 232-3, one or more hypervisors ("HYPs") 233-4, or the like.

Application 232-1 includes one or more software applications that can be provided to or accessed by location aware devices 210, base map provider device 220, and/or user device 250. Application 232-1 can eliminate a need to install and execute the software applications on location aware devices 210, base map provider device 220, and/or user device 250. For example, application 232-1 can include software associated with location management platform 230 and/or any other software capable of being provided via cloud computing environment 240. In some implementations, one application 232-1 can send/receive information to/from one or more other applications 232-1, via virtual machine 232-2.

Virtual machine 232-2 includes a software implementation of a machine (e.g., a computer) that executes programs like a physical machine. Virtual machine 232-2 can be either a system virtual machine or a process virtual machine, depending upon use and degree of correspondence to any real machine by virtual machine 232-2. A system virtual machine can provide a complete system platform that supports execution of a complete operating system ("OS"). A process virtual machine can execute a single program, and can support a single process. In some implementations, virtual machine 232-2 can manage infrastructure of cloud computing environment 240, such as data management, synchronization, or long-duration data transfers.

Virtualized storage 232-3 includes one or more storage systems and/or one or more devices that use virtualization techniques within the storage systems or devices of computing resource 232. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 232-4 can provide hardware virtualization techniques that allow multiple operating systems (e.g., "guest operating systems") to execute concurrently on a host computer, such as computing resource 232. Hypervisor 232-4 can present a virtual operating platform to the guest operating systems, and can manage the execution of the guest operating systems. Multiple instances of a variety of operating systems can share virtualized hardware resources.

User device 250 includes one or more devices capable of receiving, storing, processing, and/or providing information associated with navigational directions. For example, user device 250 can include a device associated with a vehicle, such as a smart phone, a speed detecting device, a GPS receiver device, and/or any other device capable of receiving, storing, processing, and/or providing information associated with navigational directions. In some implementations, user device 250 can provide, to location management platform 230, a request for a set of navigational directions. In some implementations, user device 250 can receive, from location management platform 230, a set of navigational directions associated with a best-fit path. In some implementations, user device 250 can be location aware device 210.

Network 260 includes one or more wired and/or wireless networks. For example, network 260 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
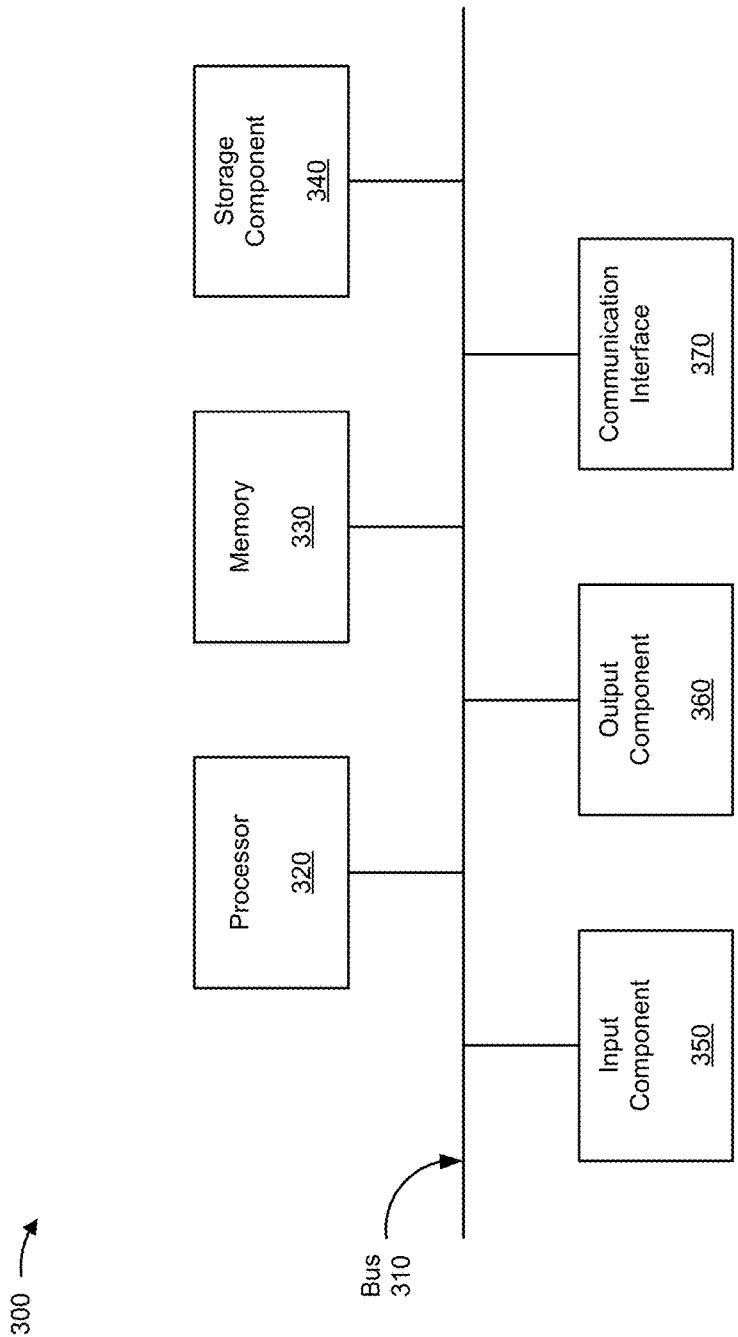
FIG. 3 is a diagram of example components of one or more devices of FIG. 2.

FIG. 3 is a diagram of example components of a device 300. Device 300 can correspond to location aware devices 210, base map provider device 220, location management platform 230 hosted within cloud computing environment 240, and/or user device 250. In some implementations, location aware devices 210, base map provider device 220, location management platform 230 hosted within cloud computing environment 240, and/or user device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320. In some implementations, memory 330 can include one or more memories.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
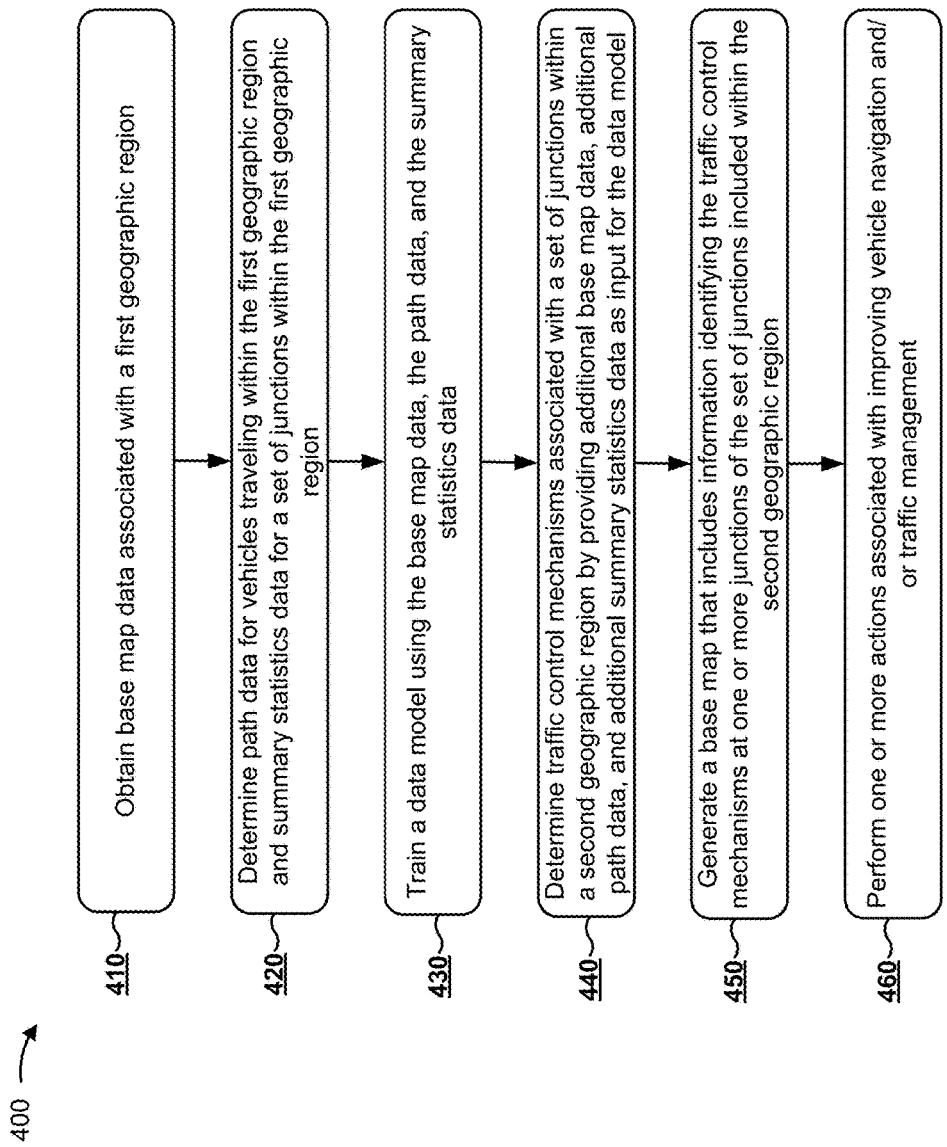
FIG. 4 is a flow chart of an example process for performing one or more actions associated with improving vehicle navigation and/or traffic management by generating and using a base map that includes information identifying traffic control mechanisms at one or more junctions in a geographic region.

FIG. 4 is a flow chart of an example process 400 for performing one or more actions associated with improving vehicle navigation and/or traffic management by generating and using a base map that includes information identifying traffic control mechanisms at one or more junctions in a geographic region. In some implementations, one or more process blocks of FIG. 4 can be performed by location management platform 230. In some implementations, one or more process blocks of FIG. 4 can be performed by another device or a group of devices separate from or including location management platform 230, such as location aware devices 210, base map provider device 220, cloud computing environment 240, and user device 250.

As shown in FIG. 4, process 400 can include obtaining base map data associated with a first geographic region (block 410). For example, location management platform 230 can obtain base map data associated with a first geographic region from base map provider device 220. The base map data can include a set of values indicating attributes of a road map, such as geographic coordinates of junctions, geographic coordinates of areas between the junctions, functional road classes, speed limits, a number of lanes associated with a road, time stamps (e.g., indicating a most recent time data included in the base map was updated), safety information (e.g., indicating high crime areas, low crime areas, etc.), construction information (e.g., identifying areas that are under construction), accident information (e.g., lane closures, road closures, etc.), and/or the like.

In some implementations, location management platform 230 can obtain base map data. For example, location management platform 230 can obtain base map data by providing a request (e.g., to base map provider device 220), by receiving base map data automatically (e.g., periodically over a time interval), or the like. Additionally, location management platform 230 can obtain or receive the base map data in a single transmission, in separate portions using multiple transmissions, or the like.

In some implementations, location management platform 230 can store base map data using a data structure. For example, location management platform 230 can store base map data using a graph data structure. In this case, the graph data structure can include one or more nodes and one or more edges. A node can identify a geographic location, such as a geographic location of a junction. An edge can identify a geographic area between nodes, such as a portion of a road between two junctions. Furthermore, the nodes and/or the edges can include metadata for storing base map data, such as metadata indicating a functional road class, a speed limit, and/or the like.

Alternatively, location management platform 230 can store base map data using a different data structure, such as a linked-list, an array, a hash table, and/or the like. In some implementations, location management platform 230 can use a data structure that includes thousands, tens of thousands, hundreds of thousands, or even millions (or more) of data points. In this way, location management platform 230 is able to store large quantities data, such that a human operator or an inferior cloud service provider can be objectively unable to analyze or process.

In this way, location management platform 230 is able to obtain base map data that can be processed in conjunction with path data and summary statistics data to train a data model, as described further herein.

As further shown in FIG. 4, process 400 can include determining path data for vehicles traveling within the first geographic region and summary statistics data for a set of junctions within the first geographic region (block 420). For example, location management platform 230 can obtain observation data from location aware devices 210 included within the first geographic region, can analyze the observation data to determine path data, and can analyze the path data to determine summary statistics data.

In some implementations, location management platform 230 can obtain observation data. For example, location aware devices 210 can monitor a set of vehicles traveling within the first geographic region, and can report observation data associated with the set of vehicles to location management platform 230. The observation data can include a set of values used to identify one or more locations of vehicles at one or more time periods, such as a geographic location of the vehicle, a time stamp, a vehicle identifier, a vehicle speed, and/or the like.

In some implementations, location management platform 230 can determine path data. For example, location management platform 230 can determine path data for a set of vehicles traveling within the first geographic region. Path data can include information identifying a path that a vehicle travels within the first geographic region and can be determined by creating logical connections between sets of geographic coordinates included in the observation data. Additionally, path data can include additional information associated with the vehicle, such as information indicating a vehicle speed, information indicating a vehicle direction, and/or the like. For example, location aware devices 210 might not report vehicle speed and/or vehicle direction, and location management platform 230 can determine vehicle speed and/or vehicle direction using geographic coordinates and time stamps.

In some implementations, location management platform 230 can determine summary statistics data. For example, location management platform 230 can determine summary statistics data for a set of junctions by analyzing the path data. In this case, location management platform 230 can analyze, for each vehicle traveling through each junction of the set of junctions, vehicle speed, vehicle direction, time stamps, geographic coordinates, and/or the like, to determine summary statistics data for the junctions. Summary statistics data can include one or more values associated with vehicle speed and/or vehicle direction, such as an average vehicle stop time at a junction, an average vehicle speed at one or more geographic coordinates associated with a junction, a maximum vehicle speed at a junction, a minimum vehicle speed at junction, a total number of vehicles traveling through the junction in a particular direction (e.g., to identify a number of vehicles turning left, turning right, traveling straight, etc.), and/or the like.

In some cases, location management platform 230 can determine summary statistics data only for straight line paths. For example, if path data includes a first set of geographic coordinates for a time when a vehicle enters a junction, and a second set of geographic coordinates for a time when a vehicle exits a junction, location management platform 230 can compare the first set of geographic coordinates and the second set of geographic coordinates to determine whether a vehicle traveled straight through the junction or turned at the junction. In this case, location management platform 230 can determine summary statistics data only if the vehicle traveled straight through the intersection.

In the case of determining summary statistics data only for straight line paths, location management platform 230 is able to make more accurate identifications of traffic control mechanisms. For example, vehicle wait time can be used to determine whether a junction has traffic lights, stop signs, or neither, and paths where a vehicle turns at a junction can cause inconsistent data (e.g., left hand turns often involve a variable turn time). In this way, location management platform 230 conserves processing resources relative to determining summary statistics for all paths.

In some implementations, location management platform 230 can store path data and/or summary statistics data using the graph data structure. For example, location management platform 230 can store path data and/or summary statistics data in metadata associated with the nodes and/or the edges of the graph data structure. As an example, path data for a set of vehicles can include information associated with a particular junction, and location management platform 230 can determine summary statistics for the junction to identify an average vehicle speed and an average vehicle wait time at the junction (these can be determined for each direction). In this case, node metadata associated with the particular junction can store values indicating the average vehicle speed and the average vehicle wait time. In this way, nodes associated with junctions can include metadata that can be used to train a data model, as described further herein.

In this way, location management platform 230 can use base map data, plan data, and summary statistics data to train a data model.

As further shown in FIG. 4, process 400 can include training a data model using the base map data, the path data, and the summary statistics data (block 430). For example, location management platform 230 can use one or more machine learning techniques to train a data model. In this case, the data model can be trained to identify traffic control mechanisms (e.g., a traffic light, a stop sign, a yield sign, etc.) located at one or more junctions of the set of junctions.

In some implementations, location management platform 230 can standardize the base map data, the path data, and the summary statistics data. For example, location management platform 230 can standardize the base map data, the path data, and the summary statistics data to allow the information to be processed to train a data model. In this case, the base map data, the path data, and the summary statistics data can be associated with different file types, different file formats, and/or the like, and location management platform 230 can apply a standardization technique to allow the information to be stored in a uniform format. In some implementations, location management platform 230 can apply different standardization techniques for different file types and/or file formats. By standardizing the base map data, the path data, and the summary statistics data, location management platform 230 can use the information to train a data model.

In some implementations, as described herein, location management platform 230 can train a data model using a supervised machine learning technique. Additionally, or alternatively, location management platform 230 can train a data model using a different type of machine learning technique, such as machine learning via clustering, dimensionality reduction, structured prediction, anomaly detection, neutral networks, reinforcement learning, or the like.

In some implementations, location management platform 230 can train a data model by associating the base map data, the path data, and the summary statistics data with one or more training values. For example, location management platform 230 can associate base map data, path data, and summary statistics data for each junction of the set of junctions included in the first geographic region with the one or more training values. A training value can indicate a likelihood of a traffic control mechanism being located at a junction. By associating base map data, path data, and summary statistics data with one or more training values, location management platform 230 can use a data model to predict whether traffic control mechanisms are located at the set of junctions as well as which traffic control mechanisms are located at the set of junctions.

In some cases, location management platform 230 can employ a classification scale that uses a training value of 1 to indicate a lowest likelihood of a junction including a particular traffic control mechanism, and a training value of 5 to indicate a highest likelihood of a junction including a particular traffic control mechanism. For example, particular values included in the base map data, the path data, and summary statistics data can be associated with particular training values based on a degree of likelihood of the particular values indicating a particular traffic control mechanism (or lack thereof). In this case, location management platform 230 can establish associations between training values and input values (base map data, path data, summary statistics data) for different types of traffic control mechanisms that can be located at junctions (e.g., a traffic light, a stop sign, a yield sign, no traffic control mechanism, etc.).

As an example, assume base map data for a first road passing through a first junction indicates a functional road class of 1 (e.g., a highway), and that base map data for a second road passing through a second junction indicates a functional road class of 5 (e.g., a residential street). In this case, location management platform 230 can train the data model by associating a value indicating a functional road class of 1 with a training value of 1 for a traffic light category (e.g., because a junction at a highway is unlikely to include a traffic light), a training value of 1 for a stop sign category (e.g., because a junction at a highway is unlikely to include a stop sign), and a training value of 5 for a no traffic control mechanism category (e.g., because a junction at a highway is likely to have no traffic control mechanism).

In the case of functional road class 5 (e.g., the residential street), location management platform 230 can associate functional road class 5 with a training value of 1 for a traffic light category (e.g., because a junction at a residential street is unlikely to have a traffic light), a training value of 4 for a stop sign category (e.g., because a junction at a residential street is likely to have a stop sign), and a training value of 4 for a no traffic control mechanism category (e.g., because a junction at a residential street is likely to have no traffic control mechanism).

As the example illustrates, training values associated with one category might be insufficient to provide conclusive evidence of whether a particular junction includes a particular traffic control mechanism. As such, location management platform 230 can train the data model by associating training values with one or more additional values included in the base map data, the path data, and/or the summary statistics data, such average vehicle wait time at a junction, average vehicle speed at a junction, maximum vehicle speed at a junction, minimum vehicle speed at a junction, vehicle direction at a junction, and/or the like.

In some implementations, location management platform 230 can use the associated values for a junction to output a classification identifying a traffic control mechanism (or lack thereof). For example, location management platform 230 can, for each direction associated with each junction within the first geographic region, classify the junctions as having a traffic light, a stop sign, a yield sign, no traffic control mechanism, or the like.

In some implementations, location management platform 230 can assign weights to the associated values to allow the data model to output a classification identifying a traffic control mechanism. For example, particular values included in the base map data, the path data, and the summary statistics data can serve as a stronger or a weaker indicator of whether a junction includes a particular traffic control mechanism, and location management platform 230 can assign weights to the particular values to improve accuracy of a classification that the data model can output.

As an example, assume average vehicle wait time and average vehicle speed are stronger indications of a particular traffic control mechanism than functional road class. In this case, an average vehicle wait time can be associated with a weight of, for example, 0.4, an average vehicle speed can be associated with a weight of, for example, 0.4, and a functional road class can be associated with a weight of, for example, 0.2. In this way, location management platform 230 can use weighted values to allow the data model to output a classification identifying a traffic control mechanism.

In some implementations, location management platform 230 can validate the data model. For example, location management platform 230 can validate the data model by using test information as input for the data model. In this case, location management platform 230 can obtain test information associated with a set of junctions with known traffic control mechanisms. Here, location management platform 230 can provide the test information as input for the data model, which can cause the data model to output one or more classifications. Additionally, location management platform 230 can validate the data model by determining whether the output of the data model satisfies a threshold level of accuracy.

In some implementations, location management platform 230 can retrain the data model. For example, if a validation check determines that a data model does not satisfy a threshold level of accuracy, then location management platform 230 can retrain the data model. In some cases, location management platform 230 can retrain the data model by providing training values associated with a junction that is incorrectly classified to a device accessible by a domain expert.

Alternatively, location management platform 230 can retrain the data model automatically. For example, location management platform 230 can retrain the data model automatically by flagging the training values associated with a junction that is incorrectly classified, and by modifying the one or more flagged training values. In this case, location management platform 230 can test the junction over an extended time period to collect a larger data set. By modifying training values and/or testing the junction over an extended time period to collect a larger data set, location management platform 230 can determine additional path data and/or additional summary statistics data needed to make a more accurate classification.

In some implementations, location management platform 230 can receive a trained data model. For example, a device external to location management platform 230 can train a data model, or a portion of the data model, in the same manner described above, and the device can provide the trained data model, or the portion of the trained data model, to location management platform 230. In this way, location management platform 230 can, but does not need to be, the device training the data model.

In this way, location management platform 230 is able to train a data model using the base map data, the path data, and the summary statistics data.

As further shown in FIG. 4, process 400 can include determining traffic control mechanisms associated with a set of junctions within a second geographic region by providing additional base map data, additional path data, and additional summary statistics as input for the data model (block 440). For example, location management platform 230 can obtain additional base map data, additional path data, and additional summary statistics data (e.g., for an entire state, an entire country, etc.), and can provide the additional data as input for the data model. In this case, the data model can output a set of classifications for the set of junctions, where a classification identifies a traffic control mechanism (or lack thereof) used for a particular direction of a junction.

In some implementations, location management platform 230 can determine whether a junction includes a traffic control mechanism. For example, location management platform 230 can provide additional base map data, additional path data, and additional summary statistics data associated with the junction as input to the data model. In this case, the data model can output a classification indicating a type of traffic control mechanism that is located at the junction.

As an example, location management platform 230 can determine that a traffic light is located at a junction. For example, assume a junction connects two multi-lane roads (e.g., roads with a functional road class of 2). Further assume the junction has an average vehicle stop time of 10 seconds. In this case, the data model can associate a value indicating a functional road class of 2 with a training value of 4 for a traffic light category, can associate a value indicating an average vehicle stop time of 10 seconds with a training value of 5 for the traffic light category, and, based on the associations, determine that a traffic light is located at the junction.

As another example, location management platform 230 can determine that a stop sign is located at a junction. For example, assume a junction connects two multi-lane roads (e.g., roads with a functional road class of 3). Further assume that vehicles traveling in a first direction (e.g., north-south) through the junction have an average vehicle stop time of 2 seconds, and that vehicles traveling in a second direction (e.g., east-west) through the junction have an average vehicle stop time of 0 seconds. In this case, the data model can associate a value indicating a functional road class of 3 with a training value of 4 for a stop sign category, can associate a value indicating an average vehicle stop time for the first direction (e.g., 2 seconds) with a training value of 5 for the stop sign category, and can associate a value indicating an average vehicle stop time for the second direction (e.g., 0 seconds) with a training value of 1 for the stop sign category. Here, based on the associations, location management platform 230 can determine that a stop sign is located at the junction for the first direction, and that no traffic control mechanism is located at the junction for the second direction.

In this way, location management platform 230 can determine traffic control mechanisms associated with a set of junctions by providing additional base map data, additional path data, and additional summary statistics as input for the data model.

As further shown in FIG. 4, process 400 can include generating a base map that includes information identifying the traffic control mechanisms at one or more junctions of the set of junctions included within the second geographic region (block 450). For example, location management platform 230 can generate a base map (e.g., a graph data structure) that includes metadata (e.g., node metadata) identifying the traffic control mechanisms at one or more junctions of the set of junctions.

In some implementations, location management platform 230 can generate a base map using a graph data structure. For example, location management platform 230 can generate a graph data structure that includes nodes, edges, and metadata. In this case, the graph data structure can include a set of nodes indicating junctions, a set of edges indicating geographic areas between the junctions, and metadata to identify the traffic control mechanisms (or lack thereof). Alternatively, location management platform 230 can generate a base map using another data structure, such as a linked-list, an array, a hash table, a tree, or the like.

In this way, location management platform 230 can generate a base map that includes information identifying the traffic control mechanisms at one or more junctions within the second geographic region.

As further shown in FIG. 4, process 400 can include performing one or more actions associated with improving vehicle navigation and/or traffic management (block 460). For example, location management platform 230 can, after generating the base map, perform one or more actions associated with improving vehicle navigation, such as provide, to a user device, a set of navigational instructions that identify a best-fit path, a set of navigational instructions that can be output using voice messages, a destination arrival time prediction, and/or the like. Additionally, or alternatively, location management platform 230 can, after generating the base map, perform one or more actions associated with improving traffic management, such as generating a recommendation to install or remove a traffic control mechanism, generating a recommendation to modify a setting of a traffic control mechanism (e.g., a signal timer on a traffic light), and/or the like.

In some implementations, location management platform 230 can determine a set of navigational directions to identify a best-fit path. For example, location management platform 230 can receive a request for a set of navigational directions, determine the set of navigational directions to identify a best-fit path (e.g., a fastest path, a safest path, a most fuel-efficient path, etc.), and provide the set of navigational directions to user device 250.

In some implementations, location management platform 230 can receive a request for a set of navigational directions. For example, location management platform 230 can receive, from user device 250, a request for a set of navigational directions that includes information indicating an arrival location and information indicating a destination location. In some cases, the request can include a request to determine a fastest path, a safest path, a most fuel-efficient path, or the like.

In some implementations, location management platform 230 can determine a best-fit path for user device 250. For example, location management platform 230 can use the base map and one or more path-finding algorithms (e.g., a fastest path algorithm, a safest path algorithm, a most fuel-efficient path algorithm, etc.) to identify a best-fit path. In this case, location management platform 230 can allow the path-finding algorithms to reference metadata identifying traffic control mechanisms, thereby ensuring that the path-finding algorithms are able to determine a best-fit path.

In some implementations, location management platform 230 can provide the set of navigational directions to user device 250. For example, location management platform can provide, to user device 250, the set of navigational directions identifying the best-fit path.

In some implementations, location management platform 230 can determine a fastest path for user device 250. For example, location management platform 230 can use the base map (which identifies traffic control mechanisms) and a fastest path algorithm to determine a fastest path. In this case, the fastest path can be a path with a least amount of stops, and location management platform 230 can select the path with the least amount of stops as a result of the base map identifying the traffic control mechanisms (or lack thereof).

In some implementations, location management platform 230 can determine a safest path for user device 250. For example, location management platform 230 can use the base map (which includes safety information) and a safest path algorithm to determine a safest path. In this case, the safest path can avoid high crime areas, avoid intersections with traffic lights (e.g., in an area with a high crime rate, stopping at traffic lights for extended time periods can be dangerous), and/or the like.

In some implementations, location management platform 230 can determine a most fuel-efficient path for user device 250. For example, location management platform 230 can use the base map (which identifies traffic control mechanisms) and a most fuel-efficient path algorithm to determine a most fuel-efficient path. In this case, location management platform 230 can select a path with a least amount of stops (e.g., thereby conserving fuel) by selecting a path that avoids all (or some) traffic control mechanisms.

Additionally, or alternatively, location management platform 230 can use the base map to provide a set of navigational directions that can be output via voice messages. For example, location management platform 230 can receive a request for a set of navigational directions, determine the set of navigational directions, and provide the set of navigational directions to user device 250. In this case, user device 250 can output the set of navigational directions using voice messages that identify one or more traffic control mechanisms in the navigational directions. In some cases, the identified traffic control mechanisms can be used as landmarks to make it easier for a user to understand the navigational directions.

As an example, a voice message in a set of navigational directions that uses the base map can state "Turn left at the traffic light on Main Street," whereas a voice message without access to the base map might state "In 500 feet, turn Left on Main Street." This reduces a risk of user error as a user can more readily identify a traffic light than a street that is 500 feet away. By using the identified traffic light in the voice message, location management platform 230 is able to provide navigational directions that are easier for a user to understand. Additionally, by providing a user with easier to understand navigational directions, a user is less likely to take an incorrect path. This conserves processing resources and/or network resources that might otherwise be used to recalculate navigational directions.

Additionally, or alternatively, location management platform 230 can use the base map to determine a destination arrival time for a set of navigational directions. For example, assume location management platform 230 receives a request for a set of navigational directions. Further assume location management platform 230 identifies a best-fit path for a user. In this case, location management platform 230 can determine a destination arrival time by analyzing base map metadata associated with one or more junctions in the identified best-fit path (e.g., metadata indicating an average vehicle stop time at a junction, an average vehicle speed at one or more geographic coordinates of the junction, etc.). In this way, location management platform 230 can determine a destination arrival time that is more accurate than a destination arrival time that is determined without the metadata of the base map.

In some implementations, location management platform 230 can generate a recommendation to install, remove, or make a modification to a traffic control mechanism. For example, location management platform 230 can analyze metadata for a set of junctions to determine whether metadata for one or more junctions satisfy a threshold (e.g., a threshold associated with traffic volume, a threshold associated with vehicle speed, etc.). In this case, location management platform 230 can generate a recommendation to install, remove, or modify a traffic control mechanism based on determining whether the one or more junctions satisfy the threshold.

As an example, assume location management platform 230 determines summary statistics data indicating an average vehicle speed of 30 miles per hour through a junction in a residential neighborhood. Further assume that a threshold associated with recommending to install stop signs in residential areas is associated with an average vehicle speed of 28 miles per hour. In this case, because the average vehicle speed satisfies the threshold speed, and because location management platform 230 identifies that there is no traffic control mechanism at the junction, location management platform 230 can recommend to add a stop sign at the junction.

As another example, location management platform 230 can generate a recommendation to modify a setting of a traffic control mechanism. In this example, assume location management platform 230 receives additional base map data, additional path data, and/or additional summary statistics data. In this case, location management platform 230 can analyze the additional base map data, the additional path data, and/or the additional summary statistics data for a junction to determine whether traffic at the junction satisfies a threshold level of congestion. In some cases, if traffic at a junction that is associated with a first direction (e.g., north-south) satisfies the threshold level of congestion, and traffic at the junction that is associated with a second direction (e.g., east-west) does not satisfy the threshold level of congestion, then location management platform 230 can generate a recommendation to modify a setting of the traffic control mechanism (e.g., a recommendation to increase or decrease a traffic light signal time associated with the first direction or the second direction).

In some implementations, location management platform 230 can provide a recommendation to install, update, and/or remove a traffic control mechanism to a device associated with an interested party. For example, location management platform 230 can provide the recommendation to a device associated with a city department of transportation, a device associated with a commercial provider that manufactures, installs, and/or removes traffic control mechanisms, and/or the like.

In this way, location management platform 230 can, after generating the base map, determine a set of navigational directions identifying a best-fit path for user device 250.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, location management platform 230 is able to identify traffic control mechanisms in a geographic region and use knowledge of the location of the traffic control mechanisms to identify a best-fit path for a user. By identifying the best-fit path for the user, location management platform 230 conserves processing resources relative to devices that are unable to utilize a base map that includes traffic control mechanisms, conserves natural resources (e.g., conservation of fuel), improves driver safety, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
obtain base map data associated with a first geographic region,
the base map data including a set of values indicating attributes of a road map, and
the base map data not including traffic control mechanisms;
determine summary statistics data for a set of junctions within the first geographic region,
the summary statistics data including information associated with a set of vehicles traveling through the set of junctions;
train a data model using the base map data and the summary statistics data,
where the one or more processors, when training the data model, are to:
associate the base map data and the summary statistics data from a junction of the set of junctions with one or more training values,
the one or more training values including a likelihood of a traffic control mechanism being located at the junction,
the traffic control mechanism including a traffic light, a stop sign, or a yield sign; and
classify the junction as having a particular traffic control mechanism based on associating the base map data and the summary statistics data with the one or more training values;
obtain, after training the data model, additional base map data associated with a second geographic region;
determine additional summary statistics data for a set of junctions within the second geographic region;
determine traffic control mechanisms associated with the set of junctions within the second geographic region by providing the additional base map data and the additional summary statistics data as input for the data model;
generate, using output of the data model, a base map that includes information identifying the traffic control mechanisms at one or more junctions of the set of junctions included within the second geographic region; and
perform, after generating the base map, one or more actions associated with improving vehicle navigation or traffic management.

2. The device of claim 1, where the set of values indicating attributes of the road map include at least one of:
one or more values indicating geographic coordinates of the set of junctions included in the first geographic region,
one or more values indicating geographic coordinates of areas between the set of junctions included in the first geographic region,
one or more values indicating functional road classes,
one or more values indicating speed limits, or
one or more values indicating a number of lanes associated with the set of junctions included within the first geographic region.

3. The device of claim 1, where the summary statistics data for a junction of the set of junctions includes at least one of:
a value indicating an average vehicle stop time at the junction,
a value indicating an average vehicle speed at one or more geographic coordinates associated with the junction,
a value indicating a maximum vehicle speed at the junction,
a value indicating a minimum vehicle speed at the junction, or
a value indicating a total number of vehicles traveling through the junction in a particular direction.

4. The device of claim 1, where the one or more processors, when determining the summary statistics data, are to:
obtain observation data for the set of vehicles traveling through the set of junctions,
the observation data identifying one or more locations of the set of vehicles at one or more time periods,
determine path data for the set of vehicles by analyzing the observation data,
the path data including information indicating vehicle speed and information indicating vehicle direction, and
determine the summary statistics data by analyzing the path data for the set of vehicles.

5. The device of claim 1, where the one or more processors, when determining the traffic control mechanisms, are to:
provide the additional base map data and the additional summary statistics data as input for the data model to cause the data model to output a set of classifications for the set of junctions within the second geographic region,
the set of classifications indicating whether the set of junctions within the second geographic region include traffic control mechanisms; and
where the one or more processors, when generating the base map, are to:
generate a data structure indicative of the base map,
the data structure including metadata identifying the traffic control mechanisms at one or more junctions of the set of junctions within the second geographic region,
the metadata being based on the set of classifications indicating whether the set of junctions within the second geographic region include traffic control mechanisms.

6. The device of claim 1, where the one or more processors, when performing the one or more actions, are to:
receive a request from a user device for a set of navigational directions,
determine a set of navigational directions by using a path-finding algorithm to analyze the base map, and
provide the set of navigational directions to the user device.

7. The device of claim 1, where the one or more processors, when performing one or more actions associated with improving traffic management, are to:
analyze metadata for the set of junctions to determine whether metadata for one or more junctions of the set of junctions satisfies a threshold level of congestion; and
generate a recommendation to install or remove a traffic control mechanism based on the one or more junctions satisfying the threshold level of congestion.

8. A non-transitory computer-readable medium storing instructions, the instructions comprising:
one or more instructions that, when executed by one or more processors, cause the one or more processors to:
obtain base map data associated with a first geographic region,
the base map data including a set of values indicating attributes of a road map, and
the base map data not including traffic control mechanisms;
determine summary statistics data for a set of junctions within the first geographic region,
the summary statistics data including information associated with a set of vehicles traveling through the set of junctions;
train a data model using the base map data and the summary statistics data,
where the one or more instructions, that cause the one or more processors to train data model, cause the one or more processors to:
associate the base map data and the summary statistics data from a junction of the set of junctions with one or more training values,
the one or more training values including a likelihood of a traffic control mechanism being located at the junction,
the traffic control mechanism including a traffic light, a stop sign, or a yield sign; and
classify the junction as having a particular traffic control mechanism based on associating the base map data and the summary statistics data with the one or more training values;
obtain, after training data model, additional base map data associated with a second geographic region;
determine additional summary statistics data for a set of junctions within the second geographic region;
determine traffic control mechanisms associated with the set of junctions within the second geographic region by providing the additional base map data and the additional summary statistics data as input for the data model;
generate, using output of the data model, a base map that includes information indicating whether the set of junctions included within the second geographic region include traffic control mechanisms; and
perform, after generating the base map, one or more actions associated with improving vehicle navigation or traffic management.

9. The non-transitory computer-readable medium of claim 8, where the one or more instructions, that cause the one or more processors to determine the additional summary statistics data, cause the one or more processors to:
determine path data for the set of vehicles by analyzing observation data,
the observation data identifying one or more locations of the set of vehicles at one or more time periods, and
the path data identifying one or more paths traveled by the set of vehicles, and determine the summary statistics data by analyzing the path data for the set of vehicles.

10. The non-transitory computer-readable medium of claim 8, where the one or more instructions, when executed by the one or more processors, further cause the one or more processors to:
obtain test information associated with a set of junctions with known traffic control mechanisms;
provide the test information as input for the data model; and
determine whether output of the data model satisfies a threshold level of accuracy.

11. The non-transitory computer-readable medium of claim 10, where the one or more instructions, that cause the one or more processors to determine whether the output of the data model satisfies the threshold level of accuracy, cause the one or more processors to:
determine that the output of the data model does not satisfy a threshold level of accuracy; and
where the one or more instructions, when executed by the one or more processors, further cause the one or more processors to:
flag the one or more training values associated with determining the output of the data model as inaccurate training values,
modify the one or more training values that are flagged,
obtain additional base map data, additional path data, and/or additional summary statistics data, and
retrain the data model by associating the additional base map data, the additional path data, and/or the additional summary statistics data with the one or more modified training values.

12. The non-transitory computer-readable medium of claim 10, where the one or more instructions, that cause the one or more processors to perform the one or more actions, cause the one or more processors to:
receive a request from a user device for a set of navigational directions,
determine the set of navigational directions using a path-finding algorithm,
determine a destination arrival time for the set of navigational directions by analyzing base map metadata for one or more junctions used in the set of navigational directions, and
provide the destination arrival time to the user device.

13. The non-transitory computer-readable medium of claim 8, where the one or more instructions, that cause the one or more processors to perform the one or more actions, cause the one or more processors to:
receive a request from a user device for a set of navigational directions,
determine the set of navigational directions using a path-finding algorithm, and
provide the set of navigational directions to the user device to cause the user device to output the set of navigational directions using voice messages, the voice messages including one or more traffic control mechanisms to be used as landmarks.

14. A method, comprising:
obtaining, by a device, base map data associated with a first geographic region,
the base map data including a set of values indicating attributes of a road map, and
the base map data not including traffic control mechanisms;
determining, by the device, summary statistics data for a set of junctions within the first geographic region,
the summary statistics data including information provided by one or more location aware devices associated with a set of vehicles traveling through the set of junctions;
training, by the device, a data model using the base map data and the summary statistics data,
where training the data model comprises:
associating the base map data and the summary statistics data from a junction of the set of junctions with one or more training values,
the one or more training values including a likelihood of a traffic control mechanism being located at the junction,
the traffic control mechanism including a traffic light, a stop sign, or a yield sign; and
classifying, by the device, the junction as having a particular traffic control mechanism based on associating the base map data and the summary statistics data with the one or more training values;
obtaining, by the device and after training the data model, additional base map data associated with a second geographic region;
determining, by the device, additional summary statistics data for a set of junctions within the second geographic region;
determining, by the device, traffic control mechanisms associated with the set of junctions within the second geographic region by providing the additional base map data and the additional summary statistics data as input for the data model;
generating, by the device, a base map that includes information indicating whether the set of junctions included within the second geographic region include traffic control mechanisms; and
performing, by the device, one or more actions associated with improving vehicle navigation or traffic management.

15. The method of claim 14, where determining the summary statistics data comprises:
obtaining observation data for the set of vehicles traveling through the set of junctions within the first geographic region,
the observation data identifying one or more locations of the set of vehicles at one or more time periods,
determining path data for the set of vehicles by analyzing the observation data,
the path data including information indicating vehicle speed and information indicating vehicle direction, and
determining the summary statistics data by analyzing the path data for the set of vehicles.

16. The method of claim 14, where determining the summary statistics data comprises:
determining summary statistics data for one or more vehicles of the set of vehicles,
the one or more vehicles being associated with vehicles traveling through the set of junctions within the first geographic region in a straight line path.

17. The method of claim 14, where training the data model comprises:
assigning weights to one or more values included in the base map data and one or more values included in the summary statistics data, and
where classifying the junction as having the particular traffic control mechanism comprises:
classifying the junction based on associating the one or more values included in the base map data and the one or more values included in the summary statistics data with the one or more training values and based on assigning weights to the one or more values included in the base map data and the summary statistics data.

18. The method of claim 14, where determining the traffic control mechanisms comprises:
determining the traffic control mechanisms by providing the additional base map data and the additional summary statistics data as input for the data model,
the data model to output a set of classifications for the set of junctions within the second geographic region,
the set of classifications indicating whether the set of junctions within the second geographic region include traffic control mechanisms; and
where generating the base map comprises:
generate the base map that includes the information indicating whether the set of junctions included within the second geographic region include traffic control mechanisms,
the information indicating whether the set of junctions within the second geographic region include traffic control mechanisms being based on the set of classifications indicating whether the set of junctions within the second geographic region include traffic control mechanisms.

19. The method of claim 14, where performing the one or more actions comprises:
analyzing metadata for the set of junctions to determine whether metadata for one or more junctions of the set of junctions satisfy a threshold,
generating a recommendation to install, remove, or make a modification to a traffic control mechanism based on determining whether the one or more junctions satisfy the threshold.

20. The method of claim 14, further comprising:
obtaining test information associated with a set of junctions with known traffic control mechanisms;
providing the test information as input for the data model;
determining whether output of the data model satisfies a threshold level of accuracy; and
retraining the data model based on whether the output of the data model satisfies the threshold level of accuracy.

* * * * *